Sept. 26, 1967  L. M. BREWER ETAL  3,343,782
BEARING AND SEALING MEANS

Filed Sept. 17, 1965  2 Sheets-Sheet 1

INVENTORS
Lee M. Brewer &
Robert P. Rohde
J. L. Carpenter
ATTORNEY

Sept. 26, 1967  L. M. BREWER ETAL  3,343,782
BEARING AND SEALING MEANS

Filed Sept. 17, 1965  2 Sheets-Sheet 2

INVENTORS
Lee M. Brewer &
Robert P. Rohde

J. L. Carpenter
ATTORNEY

United States Patent Office 3,343,782
Patented Sept. 26, 1967

3,343,782
BEARING AND SEALING MEANS
Lee M. Brewer and Robert P. Rohde, Saginaw, Mich., assignors to General Motors Corporation, Detroit, Mich., a corporation of Delaware
Filed Sept. 17, 1965, Ser. No. 488,229
5 Claims. (Cl. 230—157)

This invention relates to means for sealing the working chamber of a rotary mechanism such as a pump and for reducing frictional losses in the rotary mechanism. More particularly, this invention relates to bearing and sealing elements which are especially advantageous when included in an air pump adapted to inject air into the stream of hot exhaust gases emitted from an internal combustion engine.

For the past several years, a great deal of emphasis has been placed on development of an arrangement for reducing the proportion of unburned constituents, such as unburned hydrocarbons and carbon monoxide, in the exhaust gases emitted from automotive engines. One of the most effective arrangements so far developed is the Air Injector Reactor system. In this system, an engine driven pump injects a stream of air into the flow of hot exhaust gases at a point just downstream of the engine combustion chamber exhaust valve. At this point, the exhaust gases are extremely hot and ignite to combine with the injected air providing more complete combustion of the otherwise unburned hydrocarbons and carbon monoxide.

The requirements imposed upon the pump used to supply the air in the Air Injector Reactor system are quite stringent; for example, the pressure and the rate of the air flow from the pump must be controlled over a wide range of engine speeds for optimum reduction of exhaust emissions. It has been discovered that a semi-articulated vane pump is a very efficient and economical type for such an application.

Such a pump, however, has many moving parts each of which provides a source of friction tending to reduce the efficiency of operation. These frictional losses cannot be overcome by oils and greases used in conventional lubricating systems because during operation those lubricants would be gradually vaporized and emitted from the pump. The pump would then become another source for unburned hydrocarbons. Furthermore, while the frictional losses can be overcome by designing the pump with clearance between the rotor and the housing, any gain obtained in this manner is offset by a loss in volumetric efficiency.

This invention provides an element which affords a bearing surface between the rotor and the housing of a rotary mechanism, thereby overcoming the frictional loss, and which additionally affords a seal for the working chamber, thereby increasing the volumetric efficiency. Although this invention is particularly illustrated and described with reference to a semi-articulated vane air pump, those skilled in the art will appreciate that such a bearing and sealing element is readily adaptable to many other types of rotary mechanisms.

The details as well as other objects and advantages of this invention appear in the following description and in the drawings in which.

Figure 1:
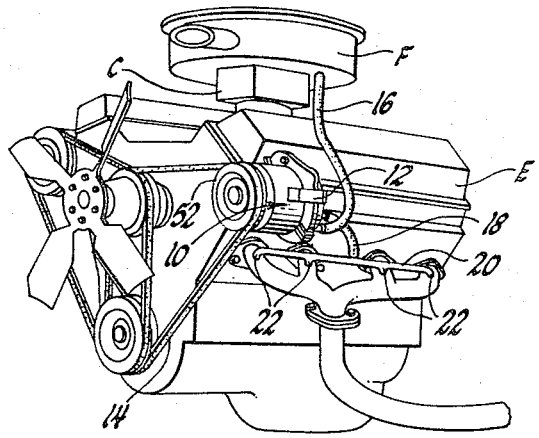
FIGURE 1 illustrates an internal combustion engine provided with an Air Injector Reactor system.

Referring first to FIGURE 1, an internal combustion engine E is provided with a carburetor C and an air filter F. An air pump 10 is secured to engine E by a bracket 12 and is driven by engine E through a belt 14. Air pump 10 has an inlet hose 16 through which clean air is drawn from air filter F and an outlet hose 18 through which air is delivered to an air manifold 20. Air manifold 20 has a series of injection tubes 22 through which air is injected into the combustion chamber stream of exhaust gases adjacent the exhaust valves.

Figure 2:
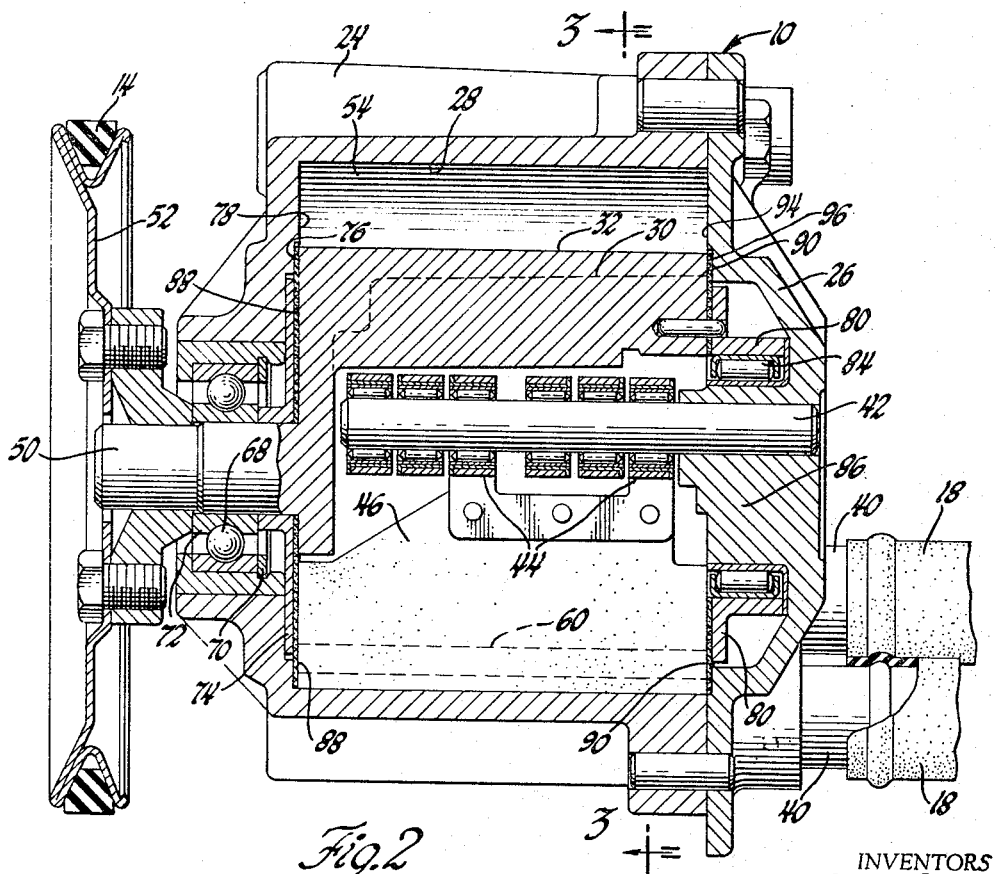
FIGURE 2 is a vertical section view through the semi-articulated vane pump illustrating the location of the sealing elements.
Figure 3:
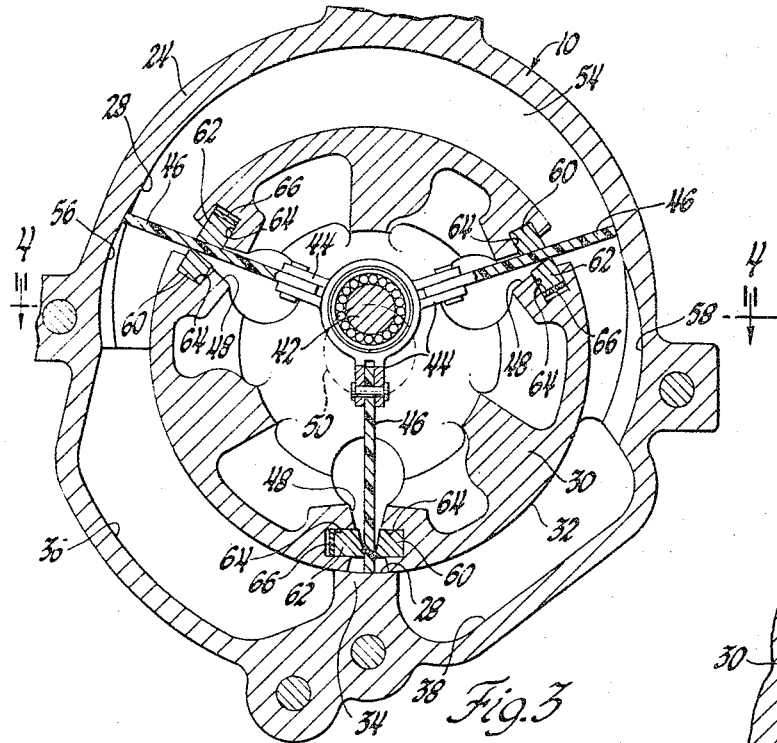
FIGURE 3 is a sectional view along line 3—3 of FIGURE 2 illustrating the arrangement of the rotor and vanes within the housing.

Referring now to FIGURES 2 and 3, air pump 10 has a concave housing 24 closed by a cover plate 26. As shown in FIGURE 3, the interior wall 28 of housing 24 is of circular cross section. A rotor 30, disposed in housing 24 on an axis eccentric to the axis of the housing, has an exterior wall 32 of circular cross section which is tangent the interior wall 28 of housing 24 at its lowermost point to provide a stripping land 34.

The interior wall 28 is recessed on opposite sides of the stripping land 34 to form an inlet area 36 and an outlet area 38. Inlet and outlet areas 36 and 38 extend axially the entire length of the pump and are provided at one end with fittings 40 to which the inlet and outlet hoses 16 and 18 are secured.

A particular advantage is achieved by locating the inlet and outlet areas 36 and 38 at the bottom of the pump since any moisture tending to condense in the pump will drain into these areas. Should the pump be mounted in an inverted position, the moisture would drain to another portion of the housing and would interfere with pump operation were it to freeze.

A shaft 42 is secured in cover plate 26 and extends into housing 24 concentrically with the interior wall 28. Three pairs of bearing supporting hubs 44 are positioned on shaft 42, each pair supporting a vane 46 which extends closely adjacent the interior wall 28 of the housing 24.

Rotor 30 surrounds shaft 42 and hubs 44 and is provided with slots 48 through which the vanes 46 extend. Rotor 30 has a shaft 50 extending through housing 24 to a pulley 52 driven by belt 14. As rotor 30 is driven (clockwise as viewed in FIGURE 3), vanes 46 are swept through the crescent-shaped working chamber 54 to draw air from inlet 36 and direct a pressurized stream of air through outlet 38. Stripping land 34 prevents leakage of air between outlet 38 and inlet 36 which would otherwise reduce the efficiency of the pump.

Figure 4:
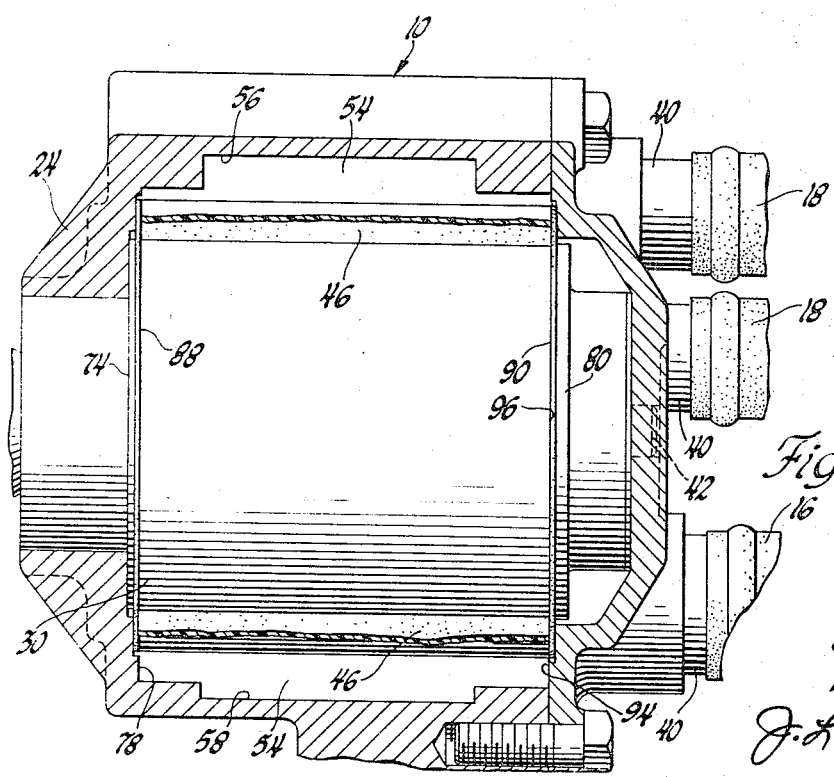
FIGURE 4 is a sectional view along line 4—4 of FIGURE 3 illustrating the location of notches provided between the working chamber and its inlet and outlet.

As shown in FIGURES 3 and 4, the interior wall 28 of housing 24 is provided with a notch 56 leading from the inlet area 36 to the working chamber 54 and a notch 58 leading from the working chamber 54 to the outlet area 38. Notches 56 and 58 prevent a sudden change in pressure as vanes 46 pass the inlet and outlet areas 36 and 38.

Each vane 46 is sealed in its corresponding slot 48 in rotor 30 by a pair of sealing strips 60 and 62 positioned in grooves 64 opening into the slots 48. Referring to FIGURE 3, it will be appreciated that as rotor 30 is driven clockwise by belt 14, sealing strips 60 drive vanes 46. Sealing strips 62 are backed by conventional leaf springs 66 which bias strips 62 against vanes 46. Sealing strips 60 and 62 thus cooperate to prevent air flow from the working chamber 54 through slots 48 into the interior portion of rotor 30.

Shaft 50 is supported in housing 24 upon a set of ball bearings 68 which are retained in place by a ring 70. The inner race 72 of the bearing set 68 indexes an end plate 74 secured about shaft 50. Bearing set 68 thus properly positions rotor 30 within housing 24 to maintain the correct axial clearance between the end wall 76 of rotor 30 and the end wall 78 of housing 24.

The opposite end of rotor 30 has an end plate 80 which rides upon a set of roller bearings 84. Roller bearings 84 as mounted on a boss 86 formed in cover plate 26 to extend toward and concentrically with rotor 30.

Figure 5:
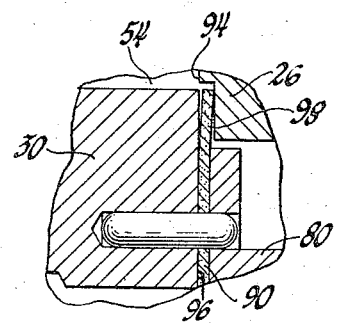
FIGURE 5 is an enlarged view of a portion of FIGURE 2 illustrating the function of the bearing and sealing element.

A pair of washer-like elements 88 and 90 are secured to each end of rotor 30 by end plates 74 and 80. These elements 88 and 90 are flexible annular carbon wafers which provide bearing surfaces between the associated end walls 76–78 and 94–96 of rotor 30 and housing 24, thereby reducing the loss in efficiency due to friction which would otherwise result. As shown in FIGURE 5, elements 88 and 90 are secured to rotor 30 only about their inner edges so that each element 88 and 90 has a free outer edge such as 98. This free edge 98 is biased by the pressure developed in working chamber 54 and forced over against the end walls 78 and 94 at a location where they overlay the end walls 76 and 96. Elements 88 and 90 thus provide an efficient end seal by preventing air flow from working chamber 54 into the interior of rotor 30.

Further, as shown in FIGURE 2, elements 88 and 90 are disposed at the ends of vanes 46 to absorb any axial thrust due to slight movement of vanes 46 along shaft 42. This prevents any frictional loss which might otherwise occur should vanes 46 contact end walls 78 and 94 of working chamber 54.

This it will be appreciated that this invention provides an element which is deflected by the pressure in the working chamber 54 to prevent any air flow from the working chamber into the interior of the rotor and thus increases the volumetric efficiency of the rotary mechanism. In addition, the element provided by this invention affords a bearing surface and a thrust absorbing surface which greatly improve frictional characteristics of the rotary mechanism.

We claim:

1. A rotary mechanism including a hollow outer body having an internal peripheral wall, an internal body positioned within said outer body and having an external peripheral wall radially spaced from at least portions of said internal peripheral wall to form a working chamber, said inner and outer bodies each having a pair of axially spaced end walls respectively connected by said external and internal peripheral walls and enclosing the ends of said working chamber, at least one end of said working chamber having associated inner and outer body end walls wherein said outer body end wall at least partially overlays said inner body end wall, said inner and outer bodies being relatively rotatable and including means to vary the pressure in said working chamber upon relative rotation, and a sealing element for at least said one end of said working chamber comprising a flexible wafer axially positioned between said inner and outer body end walls, said wafer being secured to one of said inner and outer body end walls and having a free annular edge portion biased against the other of said inner and outer body end walls by the pressure in said working chamber.

2. A rotary mechanism including a hollow outer body having an internal peripheral wall, an internal body positioned within said outer body and having an external peripheral wall radially spaced from at least portions of said internal peripheral wall to form a working chamber, said inner and outer bodies each having a pair of axially spaced end walls respectively connected by said external and internal peripheral walls and enclosing the ends of said working chamber, at least one end of said working chamber having associated inner and outer body end walls wherein said outer body end wall at least partially overlays said inner body end wall, said inner and outer bodies being relatively rotatable and including means to vary the pressure in said working chamber upon relative rotation, a sealing element for at least said one end of said working chamber comprising a flexible wafer axially positioned between said inner and outer body end walls, and a backing plate for said wafer comprising a ring axially positioned between said wafer and one of said inner and outer body end walls, said ring securing said wafer to the other of said inner and outer body end walls, said wafer having a free annular edge portion biased against said one cooperating end wall by the pressure in said working chamber.

3. A rotary mechanism including a housing having axially spaced end walls connected by an internal peripheral wall to form a cavity, a rotor positioned within said cavity and having an external peripheral wall radially spaced from at least portions of said internal peripheral wall to form a working chamber, said rotor having annular end walls adjacent and partially overlaid by annular portions of the housing end walls and having axial extensions supporting each end of said rotor in said housing end walls, said rotor being rotatable within said housing and including means to vary the pressure in said working chamber upon rotation, and sealing elements for each end of said working chamber comprising a pair of flexible annular wafers axially positioned between the rotor and housing end walls about the supporting extensions on said rotor, said wafers each having an annular inner edge secured to said rotor end wall and a free annular outer edge biased against said housing end wall by the pressure in said working chamber, said sealing elements further providing a bearing surface between the rotor and housing end walls.

4. A rotary pump comprising a housing having axially spaced end walls connected by a cylindrical internal peripheral wall to form a cavity, a rotor positioned within said cavity and having annular end walls adjacent and partially overlaid by annular portions of the housing end walls, said rotor having axial extensions supporting each end of said rotor in said housing end walls for rotation relative thereto, said rotor having an axis parallel to and spaced from the axis of said cavity and having a cylindrical external peripheral wall radially spaced from portions of said internal wall to form a working chamber, the axially extending portion of said internal wall most closely adjacent said rotor forming a stripping land, said working chamber having an inlet and an outlet adjacent and on opposite sides of said stripping land, a shaft supported in one of said housing end walls and extending concentrically into said cavity, said shaft being surrounded by said rotor, a plurality of radially extending vanes mounted for rotation upon said shaft, said rotor having slots through which said vanes extend into said working chamber, said rotor and vanes being adapted upon rotation to direct a fluid stream through said working chamber from said inlet to said outlet and to increase the pressure in said fluid stream, and sealing elements for each end of said working chamber comprising a pair of flexible annular wafers axially positioned between the rotor and housing end walls about the supporting extensions on said rotor, said wafers each having an annular inner edge secured to said rotor end wall and a free annular outer edge biased against said housing end wall by the pressure in said working chamber, said sealing elements additionally providing a bearing surface between the rotor and housing end walls, said sealing elements further providing a surface for absorbing axial thrust from said vanes.

5. An air pump adapted for use in a system for supplying air to the stream of hot exhaust gases emitted from an internal combustion engine, said air pump comprising a housing having axially spaced end walls connected by a horizontally extending cylindrical internal peripheral wall to form a cavity, a hollow rotor positioned within said cavity and having a horizontal axis parallel to and spaced from the axis of said cavity, said rotor having annular end walls adjacent and partially overlaid by annular portions of the housing end walls and having a drive shaft concentric with said rotor extending axially from one end wall of said rotor through one end wall of said housing, said drive shaft being adapted to support and rotate said rotor within said housing, said rotor having a cylindrical external peripheral wall radially spaced from portions of said internal wall to form a crescent-shaped working chamber, said housing internal wall having an axially extending portion tangent the lower-most portion of said rotor and forming a stripping land, said internal wall having a pair of recesses adjacent and on opposite sides of said stripping land forming an inlet and an outlet for said working chamber, a mounting shaft secured in the other end wall of said housing and extending concentrically into said cavity, said rotor surrounding said mounting shaft, a plurality of radially extending vanes mounted for rotation upon said mounting shaft, said rotor having sealed slots through which said vanes extend into said working chamber, said rotor and vanes being adapted upon rotation to direct an air stream through said working chamber from said inlet to said outlet and to increase the pressure in said air stream, said internal wall having notches leading from the recess forming the inlet and leading into the recess forming the outlet to achieve a gradual increase in the air stream pressure, sealing elements for each end of said working chamber comprising a pair of flexible annular wafers axially positioned between the rotor and housing end walls, a first annular backing plate secured about said driving shaft, a boss formed on said other end wall of said housing and extending concentrically with and toward said rotor, and a second annular backing plate secured to said rotor and supporting said rotor for rotation about said boss, said wafers each having an annular inner edge secured to said rotor by said backing plates and having a free annular outer edge bowed out against said housing end walls and biased thereagainst by the pressure in said working chamber, said sealing elements additionally providing a bearing surface between the rotor and housing end walls, said sealing elements further providing a surface for absorbing axial thrust from said vanes.

References Cited

UNITED STATES PATENTS

| | | | |
|---|---|---|---|
| 34,393 | 2/1862 | Clayton et al. | 91—124 |
| 569,350 | 10/1896 | Potter | 103—144 |
| 711,239 | 10/1902 | Tree | 91—124 |
| 1,595,093 | 8/1926 | Helm | 103—144 |
| 2,071,799 | 2/1937 | Mabille | 123—16 |
| 2,233,534 | 3/1941 | Jaworowski | 103—144 |
| 2,243,899 | 6/1941 | Fulcher | 230—157 |
| 2,243,901 | 6/1941 | Fulcher | 230—157 |
| 2,536,851 | 1/1951 | Latham | 230—157 |
| 2,942,774 | 6/1960 | Blackman | 230—157 |

FOREIGN PATENTS 420,921   12/1910.   France.

DONLEY J. STOCKING, *Primary Examiner.*

W. J. GOODLIN, *Assistant Examiner.*